(12) United States Patent
Kim

(10) Patent No.: US 7,360,933 B2
(45) Date of Patent: Apr. 22, 2008

(54) MOUNTING STRUCTURE FOR VEHICLE HEADLAMP

(75) Inventor: Jong Bok Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 142 days.

(21) Appl. No.: 11/300,159

(22) Filed: Dec. 13, 2005

(65) Prior Publication Data

US 2007/0115676 A1    May 24, 2007

(30) Foreign Application Priority Data

Nov. 18, 2005   (KR) .................... 10-2005-0110687

(51) Int. Cl.
*F21V 7/00*   (2006.01)
(52) U.S. Cl. ................... 362/505; 362/369; 362/549
(58) Field of Classification Search ............... 362/306, 362/368, 369, 376, 505, 546, 548, 549
See application file for complete search history.

(56) References Cited

U.S. PATENT DOCUMENTS 6,164,807 A * 12/2000 Gerstner et al. ............ 362/549

2004/0012975 A1    1/2004   Chase et al.

FOREIGN PATENT DOCUMENTS

| JP | 11-317102 | 11/1999 |
|----|-----------|---------|
| JP | 2001-243813 | 9/2001 |
| JP | 2005-011718 | 1/2005 |
| KR | 10-20020034619 A | 5/2002 |

* cited by examiner

*Primary Examiner*—John Anthony Ward
(74) *Attorney, Agent, or Firm*—Morgan Lewis & Bockius LLP

(57) ABSTRACT

Disclosed herein is a mounting structure for a vehicle headlamp. In the headlamp mounting structure, damping members, made of rubber, are inserted in middle locations of a headlamp housing to provide the headlamp housing with flexibility. Also, a steel frame is inserted in the damping members to allow for restoration or regulation of the downward deformation of the headlamp housing upon an impact with a headlamp. With the use of the damping members and the steel frame, accordingly, there is no risk of damage to a lens and other elements inside the headlamp housing due to their unintentional movements and collisions. The damping members are also made of a rubber material, ensuring the headlamp is water-tight.

9 Claims, 4 Drawing Sheets

—Prior Art—

MOUNTING STRUCTURE FOR VEHICLE HEADLAMP

CROSS-REFERENCE TO RELATED APPLICATION

This application claims priority to and the benefit of Korean Patent Application 10-2005-0110687 filed in the Korean Intellectual Property Office on Nov. 18, 2005, the entire content of which is incorporated herein by reference.

BACKGROUND OF THE INVENTION

1. Field of the Invention

The present invention relates to a mounting structure for a vehicle headlamp, and, more particularly, to a vehicle headlamp mounting structure in which damping members, made of a rubber material, are provided to absorb shock applied from an impact with a headlamp, thereby effectively alleviating damage to a lens and other internal elements due to their unintentional movements, while ensuring the headlamp being water-tight.

2. Description of the Related Art

Generally, a vehicle headlamp, also called a headlight, has a function of switching a light beam up and down, in order to prevent blinding other drivers. The headlamp is fixedly fastened to a vehicle body by use of fasteners, for example, bolts and nuts.

FIG. 1 is a sectional view illustrating a conventional mounting structure for a vehicle headlamp. As shown in FIG. 1, to mount the headlamp on the front end of a vehicle between a bonnet 3 and a bumper 5, conventionally, a mounting boss 8 is integrally formed with an upper member panel 4 of a headlamp housing 1, and is fastened by use of bolts 7. Then, a plurality of snap-fitting pins or bolts is used to be fastened to a support panel 2.

A problem of the conventional mounting structure for the vehicle headlamp is in that associated mounting elements are fixed. In this case, the headlamp often tends to crack or break since shock generated in a vehicle crash is directly applied to the headlamp. Also, elements inside the headlamp housing may be damaged as they are unintentionally moved and collide with each other.

Another problem of the conventional mounting structure is in that only bolts are used to fasten the headlamp. Such a bolt fastening has no function of preventing water from permeating into the headlamp housing in rainy weather or during a car wash. Thus, there may be a risk that the water will corrode the elements inside the headlamp housing and change the direction a light beam is projected, causing inconvenience and danger to other drivers.

In particular, the conventional headlamp mounting structure is in contravention of European Pedestrian Safety Statutes wherein, when a pedestrian collides with the front of a vehicle to apply shock downward to the upper end of a headlamp from an angle of 45° to 50°, the headlamp is affected by a shock force less than a moment of 300 Nm so that the shock force can be wholly absorbed by elements of the headlamp mounting structure, in order to effectively alleviate damage to the pedestrian.

SUMMARY OF THE INVENTION

Therefore, the present invention has been made in view of the above problems, and it is an object of the present invention to provide a mounting structure for a vehicle headlamp in which damping members, made of a rubber material, are inserted in middle locations of a headlamp housing to provide the headlamp housing with flexibility, and a steel frame is inserted in the damping members to restore or regulate the downward deformation of the headlamp housing caused in a vehicle crash.

In accordance with an aspect of the present invention, the above and other objects can be accomplished by the provision of a mounting structure for a vehicle headlamp comprising: a coupling member including a mounting boss mounted to an upper location of a headlamp housing and a fixture mounted to an upper member panel coupled to a support panel, the mounting boss and the fixture being engaged with each other; a steel frame mounted along an inner rim of the headlamp housing; and damping members including an upper damping member mounted between the headlamp housing and the upper member panel and a lower damping member mounted to a lower member panel coupled to the support panel, the damping members surrounding the steel frame.

Preferably, the headlamp mounting structure may further comprise a steel frame mount provided at the upper member panel to mount the steel frame.

Preferably, the coupling member may be located further in the headlamp housing than the upper damping member.

Preferably, the upper damping member may be mounted between the headlamp housing, the upper member panel, and the coupling member.

Preferably, the lower damping member may be located at a middle location of the lower member panel.

Preferably, the steel frame may have an upper portion mounted to the top of the headlamp housing and a lower portion mounted to the bottom of the headlamp housing. In this case, the upper portion of the steel frame may be partially surrounded by the upper damping member, and the lower portion of the steel frame may be wholly surrounded by the lower damping member.

Preferably, a part of the upper portion of the steel frame, not surrounded by the upper damping member, may be mounted to the upper member panel by use of a steel frame mount.

Preferably, the damping members may be made of a rubber material.

Preferably, the lower damping member may be mounted to the lower member panel in an insert manner.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of a mounting structure for a vehicle headlamp according to the present invention will be described with reference to the accompanying drawings.

Figure 1:
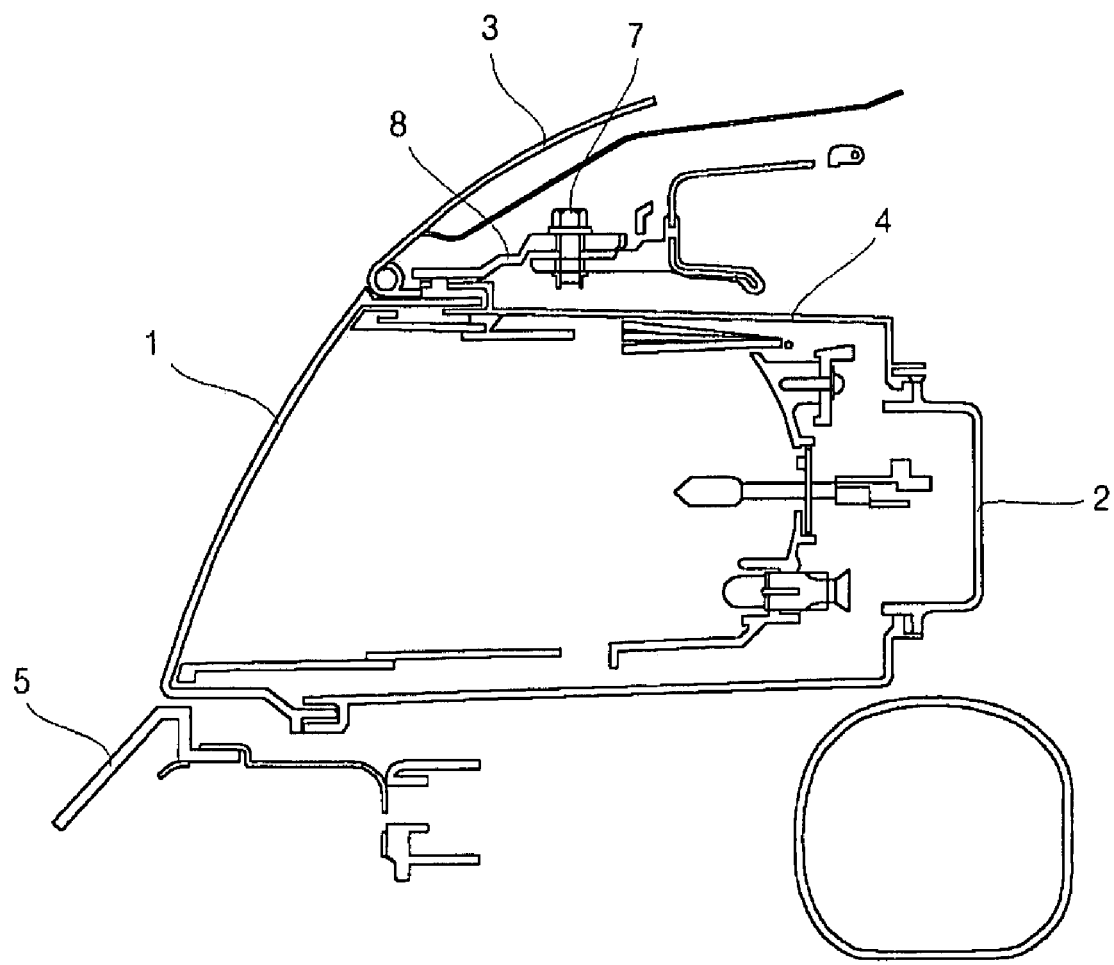
FIG. 1 is a sectional view illustrating a mounting structure for a vehicle headlamp according to the prior art.
Figure 2:
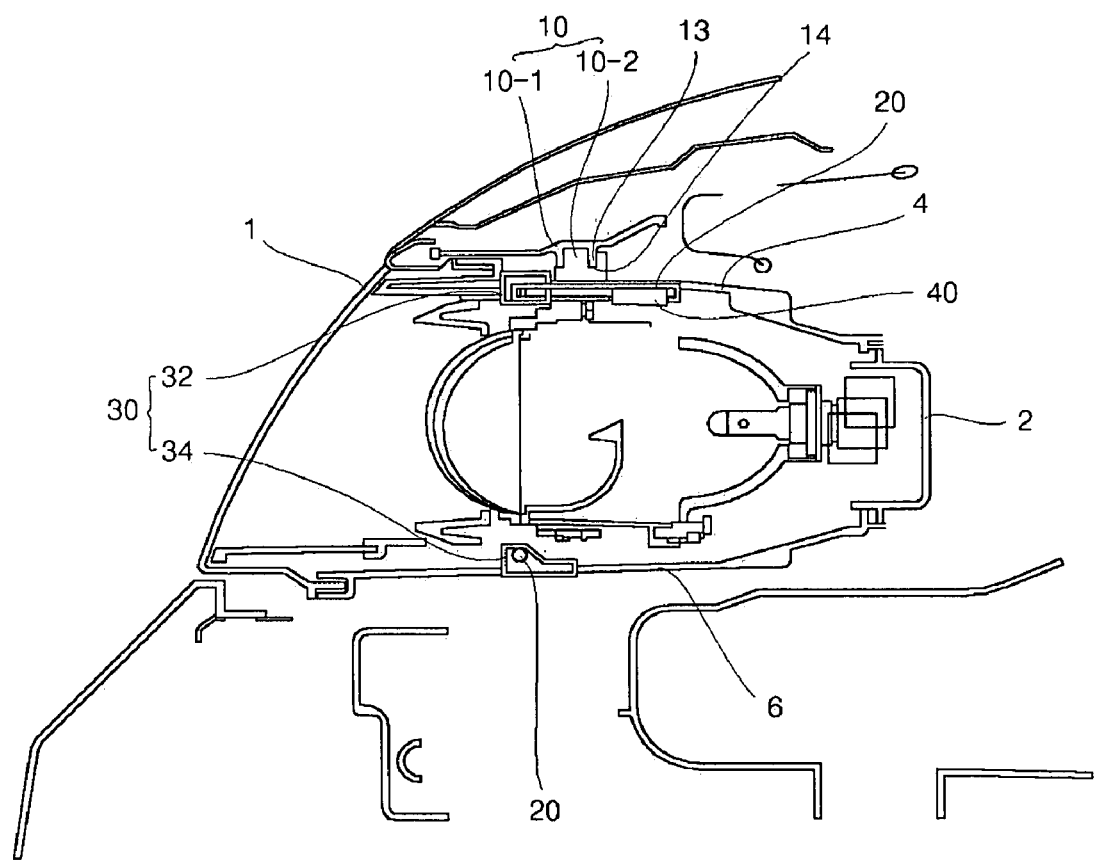
FIG. 2 is a sectional view illustrating a mounting structure for a vehicle headlamp according to the present invention.
Figure 3:
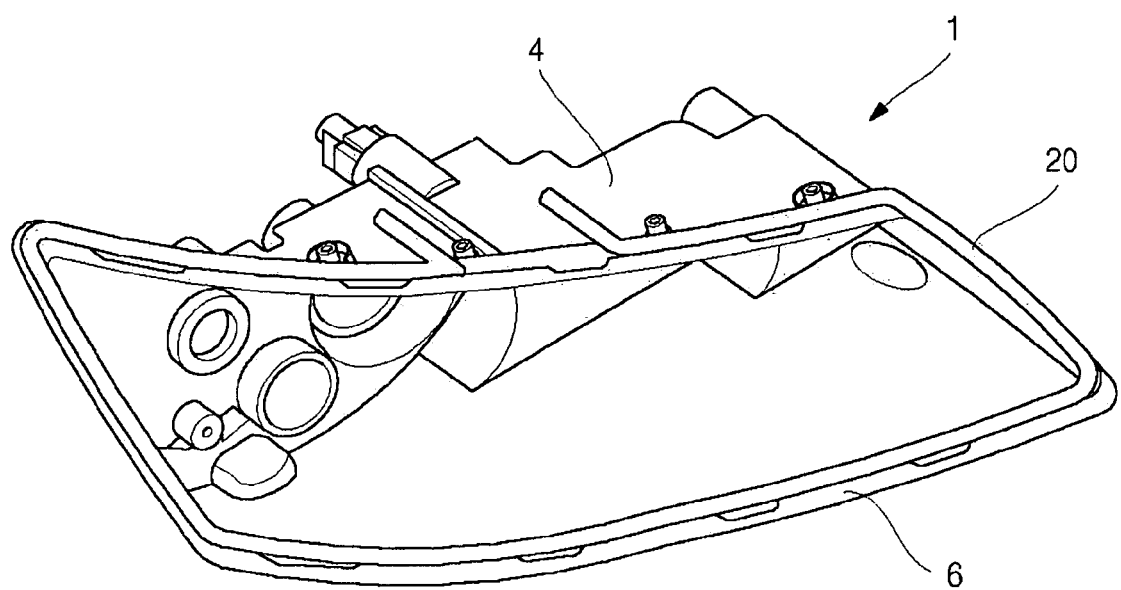
FIG. 3 is a perspective view illustrating the mounting relationship between a headlamp housing and a steel frame of the headlamp mounting structure according to the present invention.
Figure 4:
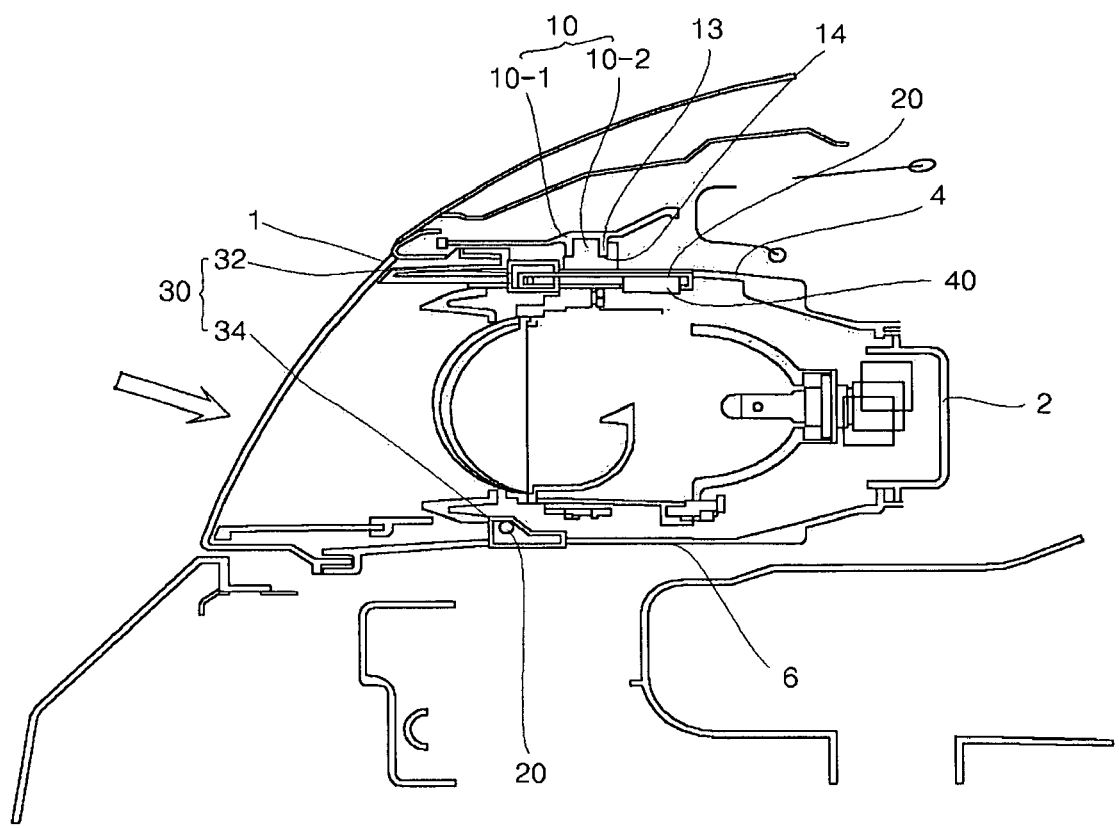
FIG. 4 is a sectional view illustrating a headlamp housing, which is deformed upon an impact with a headlamp, under the influence of the headlamp mounting structure according to the present invention.

FIG. 2 is a sectional view illustrating a mounting structure for a vehicle headlamp according to the present invention. FIG. 3 is a perspective view illustrating the mounting relationship between a headlamp housing and a steel frame of the headlamp mounting structure according to the present invention. FIG. 4 is a sectional view illustrating a headlamp housing, which is deformed upon an impact with a headlamp, under the influence of the headlamp mounting structure according to the present invention.

As shown in FIGS. 2 to 4, the mounting structure for a vehicle headlamp according to the present invention comprises: a coupling member 10; a steel frame 20; and damping members 30, i.e. an upper damping member 32, and a lower damping member 34.

The coupling member 10 includes: a mounting boss 10-1 having an end coupled to an upper location of a headlamp housing 1; and a fixture 10-2 integrally formed with an upper member panel 4.

The mounting boss 10-1 is provided at a lower end thereof with two coupling protrusions 13. The coupling protrusions 13 are configured to move downward when the headlamp receives shock. To allow the headlamp to easily move up and down, the coupling protrusions 13 are located further in than the upper damping member 32.

The fixture 10-2 is also located inside the headlamp housing 1, i.e. located further in than the upper damping member 32. The fixture 10-2 is formed with two coupling grooves 14 to correspond to the coupling protrusions 13.

As the coupling protrusions 13 are closely inserted into the coupling grooves 14, accordingly, the mounting boss 10-1 and the fixture 10-2 are able to continuously engage with each other.

As shown in FIG. 3, the steel frame 20 is mounted along an inner rim of the headlamp housing 1. The steel frame 20 is surrounded by the damping members 30.

Here, an upper portion of the steel frame 20, mounted to the top of the headlamp housing 1, is partially surrounded by the upper damping member 32. Also, a lower portion of the steel frame 20, mounted to the bottom of the headlamp housing 1, is wholly surrounded by the lower damping member 34.

In other words, the steel frame 20 is inserted in the damping members 30, thereby serving to restore or regulate the downward deformation of the headlamp housing 1 upon an impact with the headlamp.

The headlamp mounting structure according to the present invention further comprises a steel frame mount 40. The steel frame mount 40 is used to mount the remaining upper portion of the steel frame 20, not surrounded by the upper damping member 32, to the upper member panel 4.

Meanwhile, the damping members 30 are mounted in an insert manner, so that the upper damping member 32 is inserted onto the upper member panel 4 and the lower damping member 34 is inserted onto a lower member panel 6.

The upper damping member 32 is mounted between the headlamp housing 1 and the upper member panel 4, to surround the upper portion of the steel frame 20 partially. Thus, the upper damping member 32 performs an elastic operation at the top of the headlamp housing 1.

Alternatively, the upper damping member 32 may be mounted in an empty space between the headlamp housing 1 and the coupling member 10.

The lower damping member 34 is inserted to a middle location of the lower member panel 6 coupled to a support panel 2, to surround the lower portion of the steel frame 20. Thus, the lower damping member 34 performs an elastic operation at the bottom of the headlamp housing 1.

The damping members 30 are made of a rubber material having a desired elasticity.

By virtue of providing the headlamp housing 1 with the damping members 30, even in the case of an impact with the headlamp, the damping member 30 is able to alleviate damage to a lens and other elements inside the headlamp housing 1 due to their unintentional movements. Also, the damping members 30 ensure the headlamp is water-tight since they are made of a rubber material.

In the headlamp mounting structure of the present invention, it is important that the coupling member 10 of the headlamp housing 1 is located further in as compared to the prior art, and the headlamp housing 1 is provided with the steel frame 20 and the damping members 30. With this configuration, when external shock is applied to the headlamp, it causes the headlamp housing 1 to move downward as shown in FIG. 4.

For example, when the headlamp collides with an external object or a pedestrian to receive external shock in a direction indicated by an arrow of FIG. 4, the headlamp housing 1 is moved to a lower end of the lens in accordance with the operation of the damping members 30.

Since the headlamp housing 1 is moved downward rather than being pushed rearward, elements inside the headlamp housing 1 are correspondingly moved downward. This has the effect of completely preventing the elements from being damaged due to their unintentional movements and collisions.

Meanwhile, the steel frame 20, inserted in the damping members 30, has a function of providing the headlamp housing 1 with rigidity. Thus, the steel frame 20 serves to restore the downward deformation of the headlamp housing 1.

As soon as the external shock applied to the headlamp housing 1 is removed, the headlamp housing 1 is able to be returned to an original position thereof by the use of the flexibility of the damping members 30 and the rigidity of the steel frame 20.

Also, the damping members 30 ensure the headlamp housing 1 is water-tight, thereby preventing water from permeating into the headlamp housing 1 in rainy weather or during a car wash.

As apparent from the above description, with the use of a mounting structure for a vehicle headlamp according to the present invention, even in the case of an impact with a headlamp, it is possible to alleviate damage to a lens and other elements inside a headlamp housing due to their unintentional movements and collisions. Further, as a result of providing the headlamp housing with damping members made of a rubber material, the headlamp mounting structure of the present invention ensures the headlamp housing is water-tight and prevents water from permeating into the headlamp housing. This achieves an extended life of the headlamp and its lighting element.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mounting structure for a vehicle headlamp comprising:
   a coupling member including: a mounting boss mounted to an upper location of a headlamp housing, and a fixture mounted to an upper member panel coupled to a support panel of the headlamp, the mounting boss and the fixture being engaged with each other;
   a steel frame mounted along an inner rim of the headlamp housing;
   an upper damping member mounted between the headlamp housing and the upper member panel; and
   a lower damping member mounted to a lower member panel which is coupled to the support panel,
   wherein the damping members at least partially surround the steel frame.

2. The structure as set forth in claim 1, further comprising:
   a steel frame mount, provided at the upper member panel, for mounting the steel frame to the upper member panel.

3. The structure as set forth in claim 1, wherein the coupling member is located further in the headlamp housing than the upper damping member.

4. The structure as set forth in claim 1, wherein the upper damping member is mounted between the headlamp housing, the upper member panel, and the coupling member.

5. The structure as set forth in claim 1, wherein the lower damping member is located at a middle location of the lower member panel.

6. The structure as set forth in claim 1,
   wherein the steel frame has an upper portion mounted to the top of the headlamp housing and a lower portion mounted to the bottom of the headlamp housing, and
   wherein the upper portion of the steel frame is partially surrounded by the upper damping member, and the lower portion of the steel frame is wholly surrounded by the lower damping member.

7. The structure as set forth in claim 1 or 5, wherein a part of the upper portion of the steel frame, not surrounded by the upper damping member, is mounted to the upper member panel by use of a steel frame mount.

8. The structure as set forth in claim 1, wherein the damping members are made of a rubber material.

9. The structure as set forth in claim 1, wherein the lower damping member is mounted to the lower member panel in an insert manner.

* * * * *